United States Patent
Sung et al.

(10) Patent No.: US 7,489,277 B2
(45) Date of Patent: Feb. 10, 2009

(54) ROBOT CLEANER HAVING RF ANTENNA

(75) Inventors: Ji-Hoon Sung, Busan (KR); Hee-Suk Roh, Siheung (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 11/462,801

(22) Filed: Aug. 7, 2006

(65) Prior Publication Data

US 2007/0035457 A1    Feb. 15, 2007

(30) Foreign Application Priority Data

Aug. 9, 2005    (KR)    ............ 10-2005-0072926

(51) Int. Cl.
 *H01Q 1/24*    (2006.01)
 *H01Q 11/12*   (2006.01)
 *H01Q 1/36*    (2006.01)

(52) U.S. Cl. .................. 343/702; 343/741; 343/895

(58) Field of Classification Search .............. 343/702, 343/741, 895, 872
See application file for complete search history.

(56) References Cited

U.S. PATENT DOCUMENTS

| 4,089,005 | A |   | 5/1978  | Immell et al. |
| 4,306,329 | A |   | 12/1981 | Yokoi |
| 6,459,955 | B1 |  | 10/2002 | Bartsch et al. |
| 6,732,826 | B2 |  | 5/2004  | Song et al. ............ 180/169 |
| 6,868,307 | B2 | * | 3/2005 | Song et al. ............ 700/245 |
| 2003/0184493 | A1 | | 10/2003 | Robinet et al. |
| 2004/0199301 | A1 | | 10/2004 | Woo et al. |
| 2005/0132522 | A1 | | 6/2005  | Im et al. |

FOREIGN PATENT DOCUMENTS

| GB | 2038615    | 7/1980  |
| JP | 2004-260343 | 9/2004  |
| RU | 2092939    | 10/1997 |
| RU | 2169415    | 6/2001  |

OTHER PUBLICATIONS

English Abstract of RU 2 169 415, Aug. 27, 1999.
English Abstract of RU 2 092 939, Jan. 17, 1994.
English Language Abstract of JP 2004-260343, Sep. 16, 2004.

* cited by examiner

*Primary Examiner*—Shih-Chao Chen
(74) *Attorney, Agent, or Firm*—Greenblum & Bernstein, P.L.C.

(57) ABSTRACT

A robot cleaner including: a main body; and an RF antenna installed at the main body with such a length appropriate for communication with a remote controller. Because the RF antenna is installed within the main body, the degradation of traveling performance and cleaning efficiency caused as the antenna contacts with an external obstacle can be prevented.

19 Claims, 3 Drawing Sheets

ROBOT CLEANER HAVING RF ANTENNA

BACKGROUND OF THE INVENTION

1. Field of the Invention

The present invention relates to a robot cleaner having an RF antenna and, more particularly, to a robot cleaner having an RF antenna capable of improving performance of wireless communication of a robot cleaner and obtaining traveling (movement) capability.

2. Description of the Related Art

In general, a robot cleaner is a device for automatically cleaning an area desired to be cleaned by sucking debris such as dust in the cleaning area while traveling there under the control of a controller according to signals of a remote controller.

A main body of the robot cleaner includes a wireless communication module so as to be connected for inter-communication with the remote controller, and as the wireless communication module, a wireless communication module that is not expensive and uses an IrDA method is commonly used.

However, a robot cleaner having the wireless communication module adopting the IrDA method has a problem that a distance and an angle between a transmission sensor and a reception sensor are limited, and when there is an obstacle between the main body of the robot cleaner and remote controller, communication is not smoothly made therebetween.

BRIEF DESCRIPTION OF THE INVENTION

Therefore, an object of the present invention is to provide a robot cleaner having an RF antenna capable of improving performance of wireless communication of a robot cleaner.

To achieve these and other advantages and in accordance with the purpose of the present invention, as embodied and broadly described herein, there is provided a robot cleaner including: a main body; and an RF antenna installed at the main body with such a length appropriate for communication with a remote controller.

By installing the RF antenna at the robot cleaner, a limitation of a distance and an angle between a transmission sensor and a reception sensor can be reduced, and although there is an obstacle between the main body of the robot cleaner and the remote controller, the main body of the robot cleaner and the remote controller can smoothly communicate with each other.

The RF antenna can be installed to be exposed on the main body or installed in the main body.

In case where the RF antenna is exposed on the main body of the robot cleaner, it is installed to be vertically protruded from an upper surface of the body.

Also, in the case where the RF antenna is exposed on the main body of the robot cleaner, it can be also installed on an outer side of the main body in a loop structure with one side thereof opened along a circumferential direction of the main body.

When the RF antenna is installed to be exposed outside the main body, the robot cleaner may interfere with its traveling due to an obstacle positioned in a cleaning area, so by installing the RF antenna within the main body, the traveling performance and cleaning efficiency of the robot cleaner can be improved.

In case where the RF antenna is installed within the main body, the RF antenna is formed in the loop structure with one side thereof opened along the circumferential direction of the main body of the robot cleaner in the main body.

In this case, preferably, the RF antenna is formed along the circumference of the main body of the robot cleaner, lengthening the RF antenna, to thereby communicate more smoothly with the remote controller.

Preferably, the RF antenna is disposed to be tightly attached on an inner surface of the main body of the robot cleaner in order to prevent an interference with other components within the main body.

In the case where the RF antenna is installed within the main body, the RF antenna can be formed in a plurality of opened loop structures, and in this case, the plurality of loop structures are spaced apart with each certain interval therebetween along the heightwise direction of the main body of the robot cleaner, and respective one ends of the opened portion are electrically connected.

In the case where the RF antenna is installed within the main body, it is formed in a spiral structure on the same plane and installed within the main body.

By forming the RE antenna with the plurality of loop structures that are electrically connected or in the spiral structure, the length of the antenna can increase to perform communication with the remote controller more smoothly.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The present invention will be described with reference to the accompanying drawings. A detailed description for a known art or construction will be omitted to have the gist of the present invention clarified.

Figure 1:
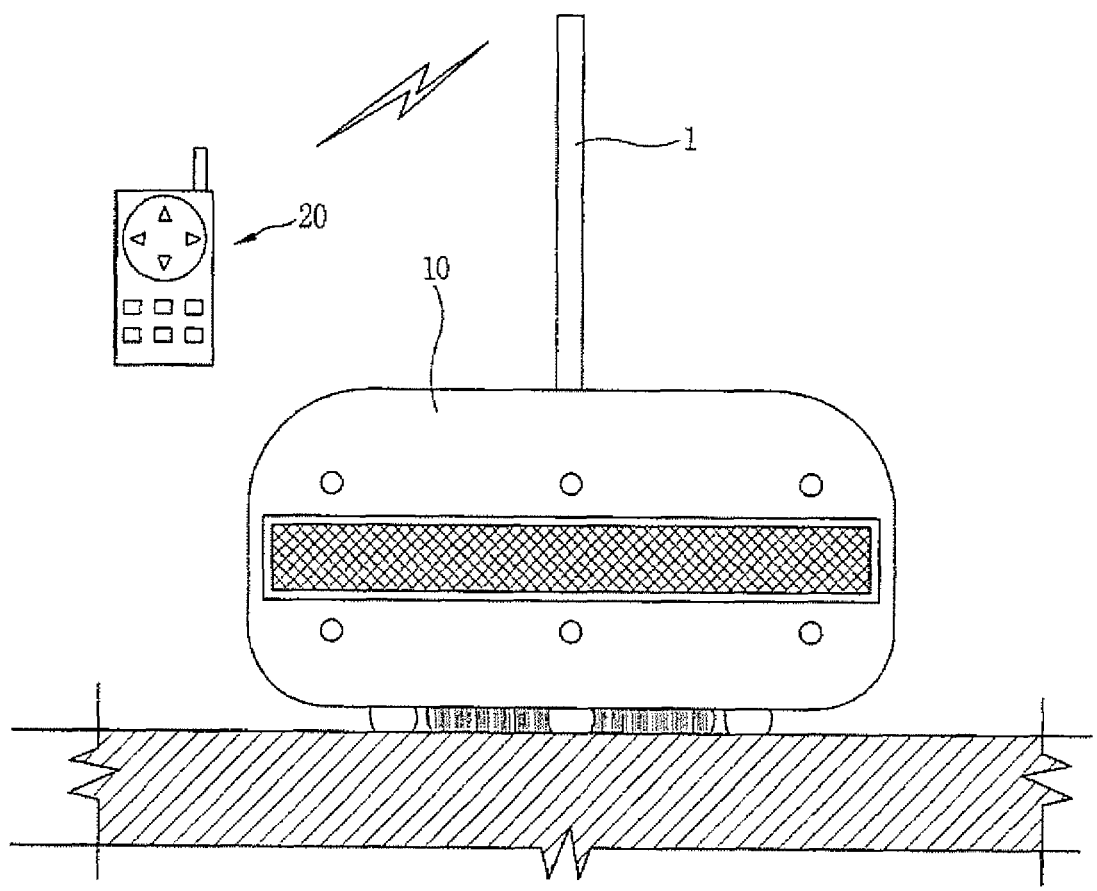
FIGS. 1 and 2 show the structure of a robot cleaner having an RF antenna according to one embodiment of the present invention.
Figure 2:
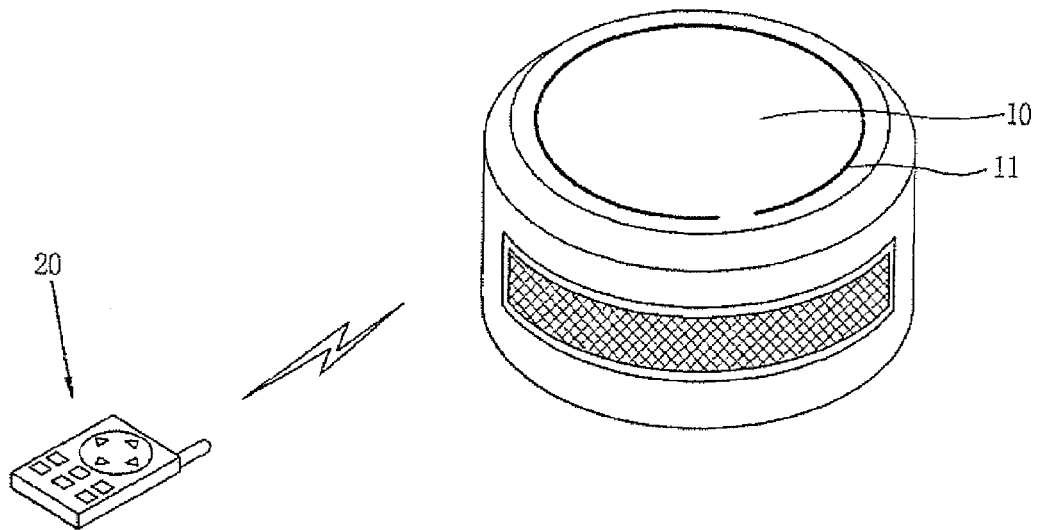

FIGS. 1 and 2 show the structure of a robot cleaner having an RF antenna according to one embodiment of the present invention.

As shown in FIGS. 1 and 2, the robot cleaner having an RF antenna according to one embodiment of the present invention includes a main body 10 and RF antennas 1 and 11 that have a length appropriate for communication with a remote controller 20 and installed to be exposed on an outside of the main body 10 of the robot cleaner.

The main body 10 of the robot cleaner includes a dust container (not shown) for keeping sucked dust, a sensor for sensing a cleaning area and an obstacle and a driving unit (not shown) for traveling.

As shown in FIG. 1, the RF antenna 1 is formed to be protruded vertically on an upper surface of the main body 10 of the robot cleaner with a length appropriate for communication with the remote controller 20.

Thus, in the present invention, in order to wirelessly communicate with the remote controller 20, the RF antenna 1 is applied as a wireless communication module installed at the main body 10 of the robot cleaner, and according to this structure, degradation of communication performance by an obstacle positioned between the main body 10 of the robot cleaner and the remote controller 20 can be prevented.

With reference to FIG. 2, the RF antenna can be formed in a loop structure with one side thereof opened along a circumferential direction of the main body 10 of the robot cleaner and installed at an outer side of the main body.

In this case, compared with the vertically protruded antenna, there is less restriction for lengthening the length of the antenna 11, so the length of the antenna 11 can be sufficiently obtained to make wireless communication smooth.

A robot cleaner having an RF antenna according to a second embodiment of the present invention will now be described in detail with reference to the accompanying drawings. The same reference numerals are given to the same construction as in the first embodiment of the present invention.

Figure 3:
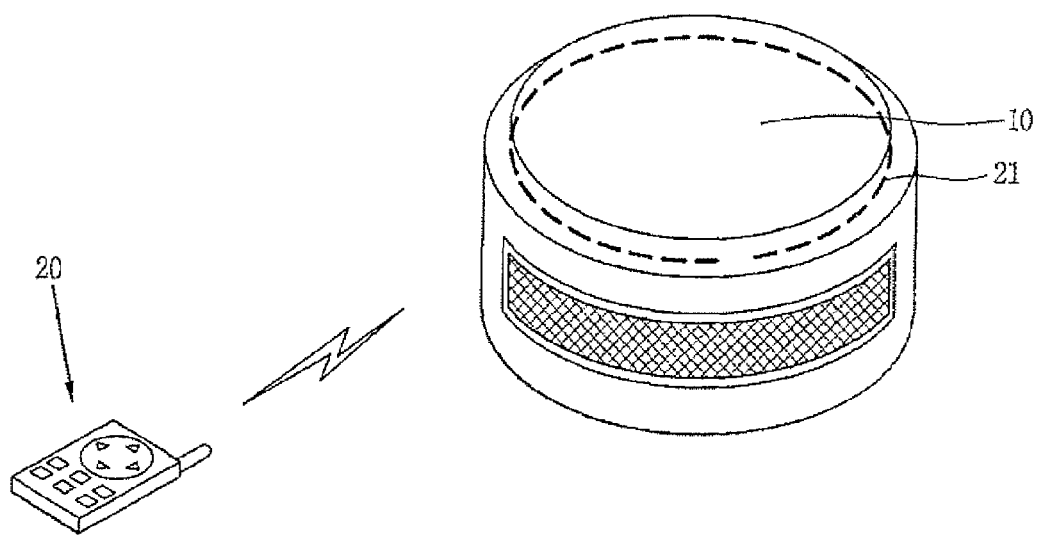
FIGS. 3 to 5 show the structure of a robot cleaner having an RF antenna according to another embodiment of the present invention.
Figure 4:
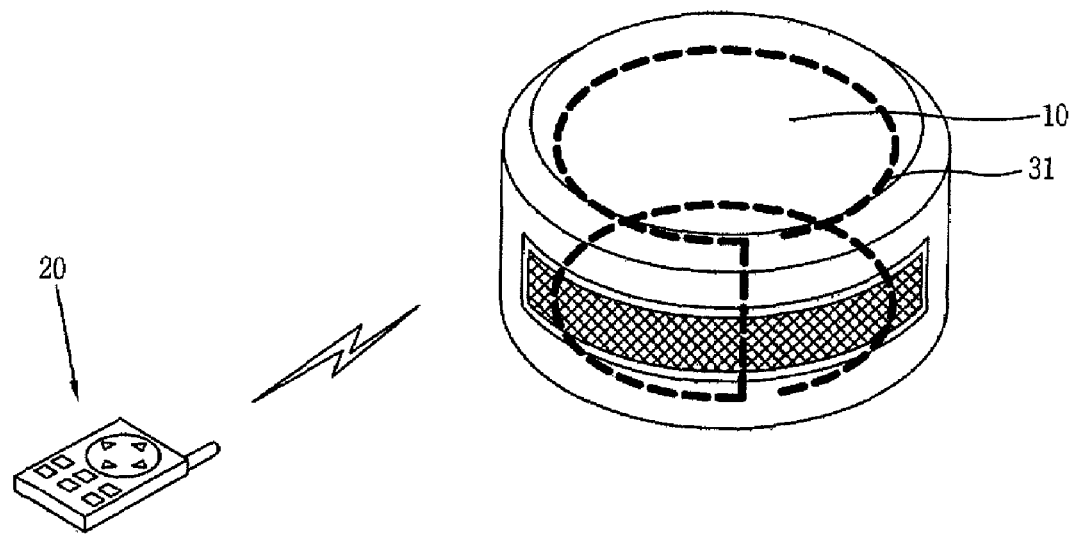
Figure 5:
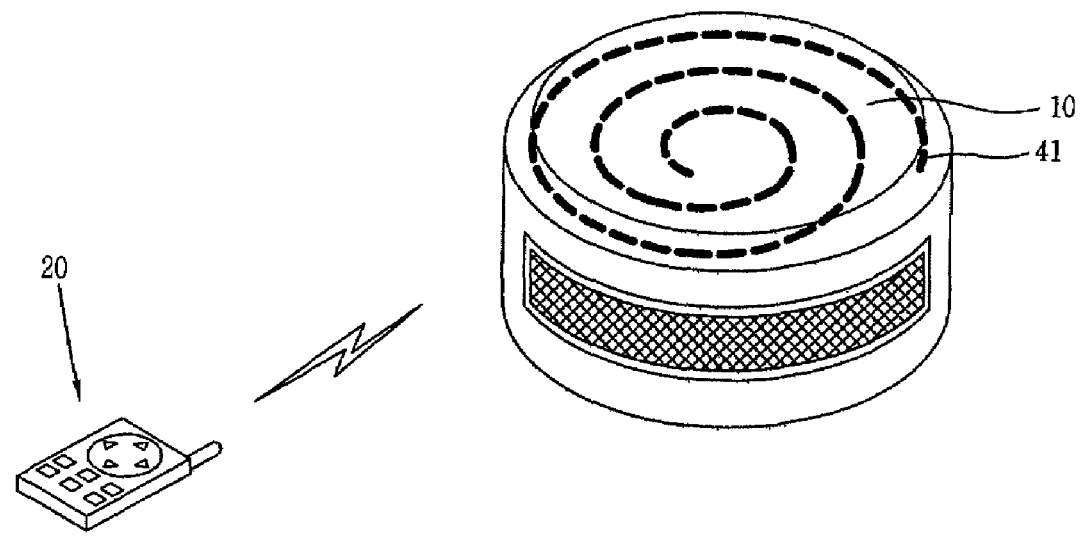

FIGS. 3 to 5 show the structure of a robot cleaner having an RF antenna according to another embodiment of the present invention.

As shown in FIGS. 3 to 5, the robot cleaner having an RF antenna 21 according to the second embodiment of the present invention includes a main body 10 of the robot cleaner; and an RF antenna 21 having the length appropriate for communication with the remote controller 20 and installed in the main body 10.

With reference to FIG. 3, the RF antenna 21 is formed in a loop structure with one side thereof opened along a circumferential direction of the main body 10 of the robot cleaner.

In this case, the RF antenna 21 can have various shapes such as a circular shape, a rectangular shape, a square shape according to the shape of the main body 10 of the robot cleaner, and preferably, the RF antenna 21 with the longest length is formed along the circumference of the main body 10 of the robot cleaner.

In addition, in order not to cause an interference with other components within the main body 10, preferably, the RF antenna 21 is disposed to be tightly attached on the inner surface of the main body 10 of the robot cleaner.

With reference to FIG. 4, a structure is shown in which the length of the RF antenna is sufficiently secured within the main body of the robot cleaner to wirelessly communicate with the remote controller more smoothly.

As shown, the RF antenna 31 can be formed in a structure with a plurality of opened loops structure, and in this case, the plurality of loop structures can be spaced apart by a certain interval along the direction of the height of the main body of the robot cleaner and one ends of the opened portions are electrically connected.

FIG. 4 shows the RF antenna 31 with two loop structures, but if a longer antenna is required for smooth wireless communication with the remote controller three or more loop structures can be formed.

FIG. 5 shows a different structure in which the length of an RF antenna 41 is sufficiently secured within the main body of the robot cleaner to perform more smooth wireless communication with the remote controller.

As shown in FIG. 5, the RF antenna 41 can be positioned at any portion within the main body 10, and in this respect, in order to prevent an interference with other components while securing an appropriate length of the antenna 41, the RF antenna 41 is preferably installed at an upper portion of the main body 10.

With the structure, degradation of a traveling performance that can occur as the RF antenna is formed to be exposed outside the main body can be prevented.

Namely, in the case where the RE antenna is expose outside the main body 10 of the robot cleaner, when the robot cleaner performs cleaning while traveling on a lower portion of an obstacle such as a chair or a table, it may be caught by the lower portion of the chair or the table, degrading the traveling performance and the cleaning efficiency. Comparatively, in the case where the antenna is installed within the main body of the robot cleaner, an interference with an ambient obstacle due to the antenna cannot occur, so that the traveling performance and the cleaning efficiency can be more improved.

As so far described, the robot cleaner having the RF antenna have many advantages.

That is, for example, by applying the RF antenna to the main body of the robot cleaner, degradation of communication performance as an obstacle is positioned between the main body of the robot cleaner and the remote controller can be prevented.

In addition, because the RF antenna is installed within the main body, the degradation of traveling performance and cleaning efficiency caused as the antenna contacts with an external obstacle can be prevented.

Moreover, because the RF antenna is formed in the loop structure or in the spiral structure along the circumferential direction of the main body of the robot cleaner, the length of the antenna can be sufficiently secured to further improve the wireless communication performance with the remote controller.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A robot cleaner comprising:
   a main body having a particular shape; and
   a RF antenna installed at the main body with a length appropriate for communication with a remote controller, wherein the RF antenna is configured to correspond to the particular shape of the main body.

2. The robot cleaner of claim 1, wherein the RF antenna is disposed along a surface of the main body.

3. The robot cleaner of claim 2, wherein the RF antenna has a structure on a same that is plane parallel to at least one of a top surface or bottom surface of the main body.

4. The robot cleaner of claim 3, wherein the RF antenna is attached to at least one of a top surface, a bottom surface, and a side surface of the main body.

5. The robot cleaner of claim 3, wherein the RF antenna is exposed to an outside of the main body, or installed within the main body.

6. The robot cleaner of claim 1, wherein the RF antenna is configured to follow a contour of the particular shape of the main body.

7. The robot cleaner of claim 6, wherein the particular shape of the main body has a cylindrical form, and the RF antenna is disposed in a circumferential direction of the main body.

8. The robot cleaner of claim 7, wherein the RF antenna is formed in a loop shape with one side thereof opened along a circumferential direction of the main body.

9. The robot cleaner of claim 8, wherein the RF antenna is formed along a circumferential portion of the main body.

10. The robot cleaner of claim 9, wherein the RF antenna is disposed to be tightly attached on an inner surface of the main body of the robot cleaner.

11. The robot cleaner of claim 7, wherein the RF antenna is formed in a plurality of opened loop structures, the plurality of loop structures are spaced apart with each certain interval therebetween along the heightwise direction of the main body of the robot cleaner, and respective first ends of the opened portion are electrically connected.

12. The robot cleaner of claim 7, wherein the RF antenna is formed in a spiral structure on a same plane.

13. The robot cleaner of claim 7, wherein the RF antenna is disposed at the upper or lower portion of the main body.

14. A robot cleaner comprising:
a main body having a particular shape; and
a RF antenna installed at the main body with a length appropriate for communication with a remote controller, wherein the RF antenna is configured to follow a contour of the particular shape of the main body.

15. The robot cleaner of claim 14, wherein the RF antenna has a structure on a same plane that is parallel to at least one of a top surface or bottom surface of the main body.

16. The robot cleaner of claim 14, wherein the particular shape of the main body has a cylindrical form, and the RF antenna is disposed in a circumferential direction of the main body.

17. The robot cleaner of claim 16, wherein the RF antenna is formed in a loop shape with one side thereof opened along a circumferential direction of the main body.

18. The robot cleaner of claim 16, wherein the RF antenna is formed in a plurality of opened loop structures, the plurality of loop structures are spaced apart with each certain interval therebetween along the heightwise direction of the main body of the robot cleaner, and respective first ends of the opened portion are electrically connected.

19. The robot cleaner of claim 16, wherein the RF antenna is formed in a spiral structure on the same plane.

* * * * *